(12) United States Patent
Shen et al.

(10) Patent No.: US 6,483,884 B1
(45) Date of Patent: Nov. 19, 2002

(54) ANTENNA DIVERSITY SWITCHING SYSTEM FOR TDMA-BASED TELEPHONES

(75) Inventors: Qun Shen, Cary, NC (US); Michael Lenzo, Apex, NC (US)

(73) Assignee: Ericsson Inc., Plano, TX (US)

( * ) Notice: Subject to any disclaimer, the term of this patent is extended or adjusted under 35 U.S.C. 154(b) by 0 days.

(21) Appl. No.: 09/000,593

(22) Filed: Dec. 30, 1997

(51) Int. Cl.[7] .................................................. H04L 1/02
(52) U.S. Cl. ...................................... 375/347; 455/135
(58) Field of Search .................................. 375/347, 147, 375/316, 346, 349; 455/277.1, 134, 135; 342/367

(56) References Cited

U.S. PATENT DOCUMENTS

| | | | |
|---|---|---|---|
| 5,561,673 A | * 10/1996 | Takai et al. | 714/708 |
| 5,661,762 A | * 8/1997 | Petranovich et al. | 375/347 |
| 5,742,509 A | * 4/1998 | Goldberg et al. | 701/211 |
| 5,952,963 A | * 9/1999 | Shen et al. | 342/367 |
| 5,960,046 A | * 9/1999 | Morris et al. | 375/347 |
| 5,991,613 A | * 11/1999 | Euscher et al. | 455/277.1 |
| 6,032,033 A | * 2/2000 | Morris et al. | 455/277.2 |

FOREIGN PATENT DOCUMENTS

| | | |
|---|---|---|
| EP | 0 676 870 A1 | 8/1994 |
| EP | 0 666 654 A2 | 3/1995 |
| WO | WO 94/10764 | 5/1994 |
| WO | WO 94/15411 | 7/1994 |
| WO | WO 96/02984 | 2/1996 |

OTHER PUBLICATIONS

S. Safavi, L.B. Lopes, *Novel Techniques For Performance Optimisation Of Dect Receivers With non–Linear Front–End*, Electronic and Electrical Engineering Department, The University of Leeds Leeds LS2 9JT, UK, 1996 IEEE.

S. Safavi, L.B. Lopes, P.E. Mogensen and F. Frederiksen, *An Advanced Base Station Receiver Concept For DECT*, Electronic and Electrical Engineering Department, The University of Leeds Leeds LS2 9JT, UK, 1995 IEEE.

\* cited by examiner

*Primary Examiner*—Chi Pham
*Assistant Examiner*—Kevin M Burd

(57) ABSTRACT

A system for selecting an antenna from a diversity of antennas in a DECT, PWT, or TDMA-based antenna selection and switching system is disclosed. When signals are received from a plurality of antennas, the wireless antenna selection and switching system automatically selects either a real-time or a time-delayed signal authentication process. The selected process then selects the antenna that will provide the clearest signal quality.

18 Claims, 5 Drawing Sheets

ANTENNA DIVERSITY SWITCHING SYSTEM FOR TDMA-BASED TELEPHONES

BACKGROUND OF THE INVENTION

The present invention relates to a process for selecting an antenna in a wireless communication system having at least two antennas. In particular, the present invention is designed to select the best antenna based on real and time delayed quality indicators.

In wireless communication systems, incoming signals often experience time dispersion and fading which is referred to as multipath effect. Multipath effect occurs when a signal and its replica arrive at a receiver out of phase to any extent. Generally, multipath effect occurs because artificial and natural obstructions cause transmitted signals to follow several propagation paths from a transmitter to a receiver. In wireless technology, the phase differences of the signals arriving at the receiver produce background noise, and in severe cases, cause the receiver to squelch. Conventional wireless technology utilizes antenna diversity to minimize this problem. A wireless network commonly includes more than one antenna positioned such that the signals received by the antennas are not correlated.

In DECT (Digital Enhanced Cordless Telephony) and PWT (Personal Wireless Telephony) systems, for example, two antennas are available in the base station and/or portable. FIG. 1 and FIG. 2 illustrate a conventional wireless system configuration that includes a base station and a portable having two antennas.

When more than one antenna is used in a wireless system, a protocol is employed to select the best antenna. Normally, antenna selection is based on a singular quality indicator adapted from the field of cryptography. The kinds of quality indicators may be divided into two categories namely: (1) those which are designed to authenticate signal transmissions and select an antenna as the signal is received and (2) those which are designed to authenticate signal transmissions and select an antenna after the signal is received. Known devices of both types have drawbacks and disadvantages.

In a TDMA-based system, for example, the antenna selection is controlled by software or logic circuitry. In this system, a cyclical redundancy check (CRC) like parameter is generally used to select an antenna after the signal is received. CRC is based on polynomial division in which each bit of a packet of data represents one coefficient of a polynomial. The polynomial is then divided by a preprogrammed polynomial to yield a quotient polynomial and in some cases a remainder polynomial. When the division yields a remainder polynomial., the system assumes that a transmission error occurred and selects another antenna. If, however, the division does not yield a remainder polynomial, the system assumes no transmission errors occurred and therefore does not select another antenna.

The antenna selection process is illustrated in FIG. 3. A CRC error rate that produces good speech quality is used as a threshold for selecting an appropriate antenna. If the present antenna provides a CRC error that is below the threshold value, no switching occurs. However, when the CRC error rate rises above the threshold value, another antenna is selected.

While CRC provides antenna selection by authenticating transmitted data, it has disadvantages. Its primary shortcoming is that antenna selections are not made in real time. The present antenna selected is based on a previous CRC comparison which does not change until the antenna receives a poor quality signal. The time delay that exists between receiving an incoming signal and selecting another antenna makes the selection process susceptible to error due to interference. A CRC selection may be accurate if a transmitter or receiver is stationary or moves at a slow rate of speed, because the communication environment is subject only to slight variations in time. However, when a transmitter or receiver moves at a high rate of speed, this time delayed process may be ineffective because it may not react to a changing environment and thus, it may be susceptible to interference.

Another technique for antenna diversity switching authenticates signal transmissions and selects an antenna as the signals are received. Preamble diversity switching is an example of a system that provides real-time measurements and real-time antenna selection. Preamble diversity switching sequentially measures the receive signal strength of a diversity of antennas at the beginning of each extended preamble. The receive signal levels of each antenna, which are the Receive Signal Strength Indicators (RSSI), are stored and compared. The antenna with the higher RSSI value is selected. When the RSSI value associated with another antenna is higher, that antenna is then selected. An example of a preamble diversity switching process is shown in FIG. 4.

The preamble diversity switching process provides the benefit of selecting an antenna as signals are received. The system is less affected by rapid environmental change. However, problems arise when differences between RSSI values are insignificant. When insignificant differences exist, the system may experience some uncertainty when selecting an antenna. This is simply because minor differences in RSSI values indicate that the signal qualities received by the antennas are similar and therefore, an of antenna selection will not necessarily improve receiving quality. Therefore, a preamble diversity switching process alone may not be the best parameter for selecting an antenna. An additional indicator may be desirable to select an optimal antenna.

It is therefore an object of the invention to provide an improved antenna selection process for a TDMA-based telephone communication system. In this disclosure, a: TDMA/PWT based system is illustrated.

Another object of the invention is to implement an appropriate decision strategy that considers the limitations of the signal authenticating processes and the error rates of signal transmissions.

Still another object of the invention is to provide an improved antenna selection process for TDMA-based systems that may employ more than two antennas.

SUMMARY OF THE INVENTION

Pursuant to the invention, a wireless antenna selection and switching system is provided which is capable of selecting an antenna from a diversity of antennas. The antenna diversity switching system is capable of measuring signal quality. When signals are received from a plurality of antennas, the wireless antenna selection and switching system automatically selects a real-time or a time-delayed signal authentication process. The chosen process then selects the antenna that will provide the clearest signal quality.

DETAILED DESCRIPTION OF THE PRESENTLY PREFERRED EMBODIMENTS

Figure 1:
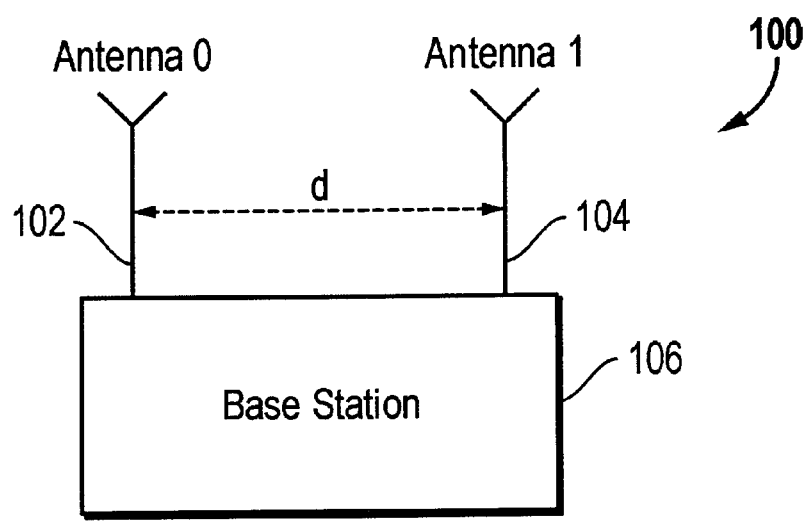
FIG. 1 is a block diagram of a conventional wireless base station having a diversity of antennas.
Figure 2:
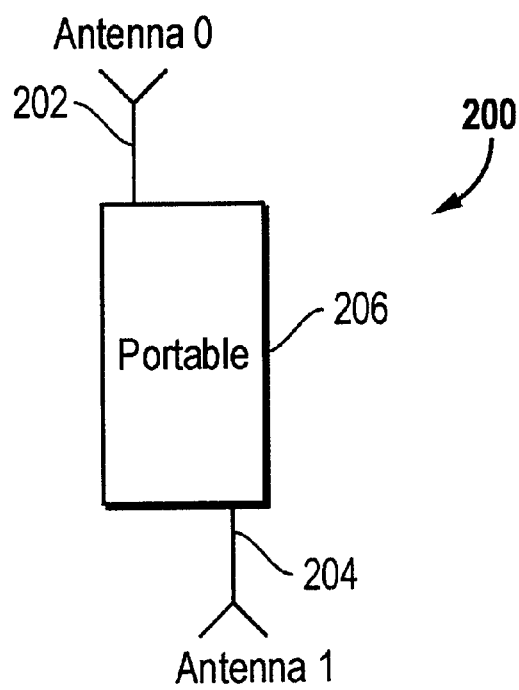
FIG. 2 is a block diagram of a conventional wireless portable station having a diversity of antennas.
Figure 3:
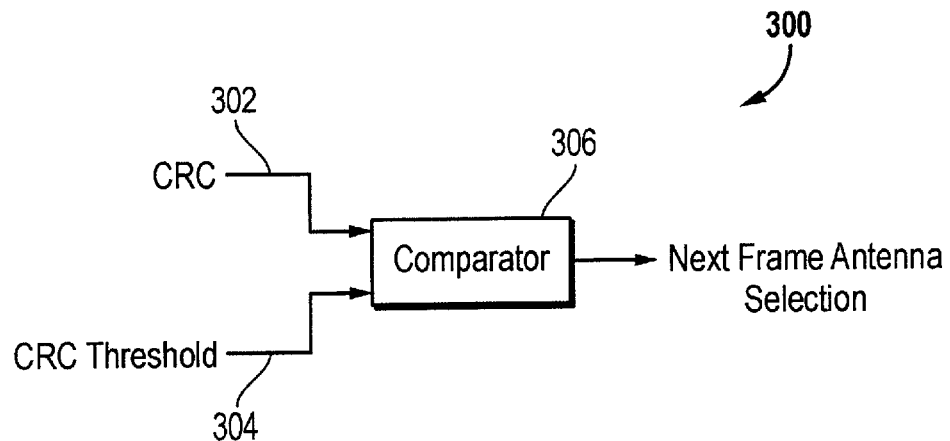
FIG. 3 is a block diagram of a Cyclical Redundancy Check antenna switching process used in the prior-art stations of FIG. 1 and FIG. 2.
Figure 4:
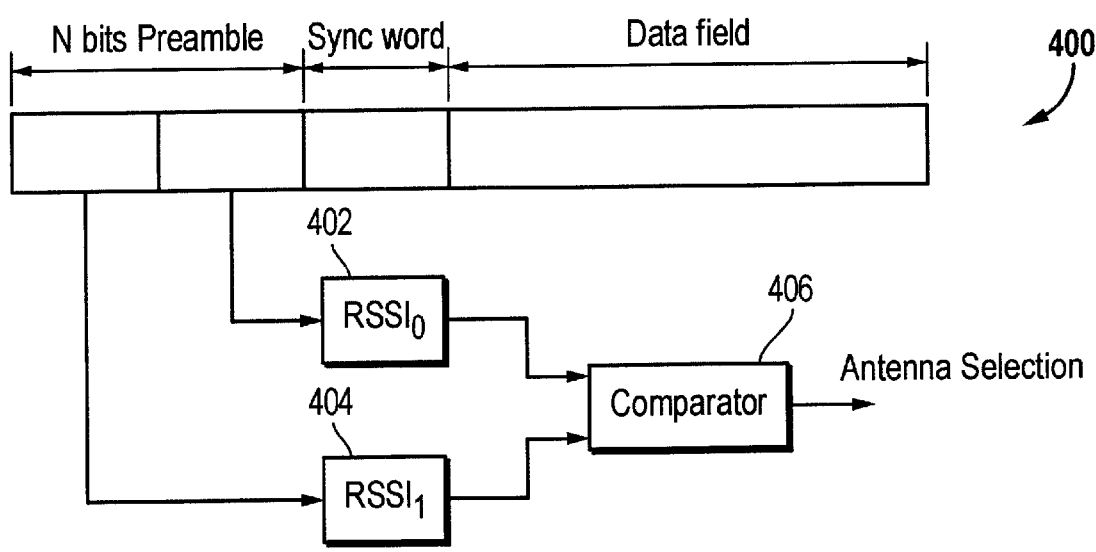
FIG. 4 is a block diagram of a Preamble Diversity Switching Process also used in the prior-art stations of FIG. 1 and FIG. 2.
Figure 5:
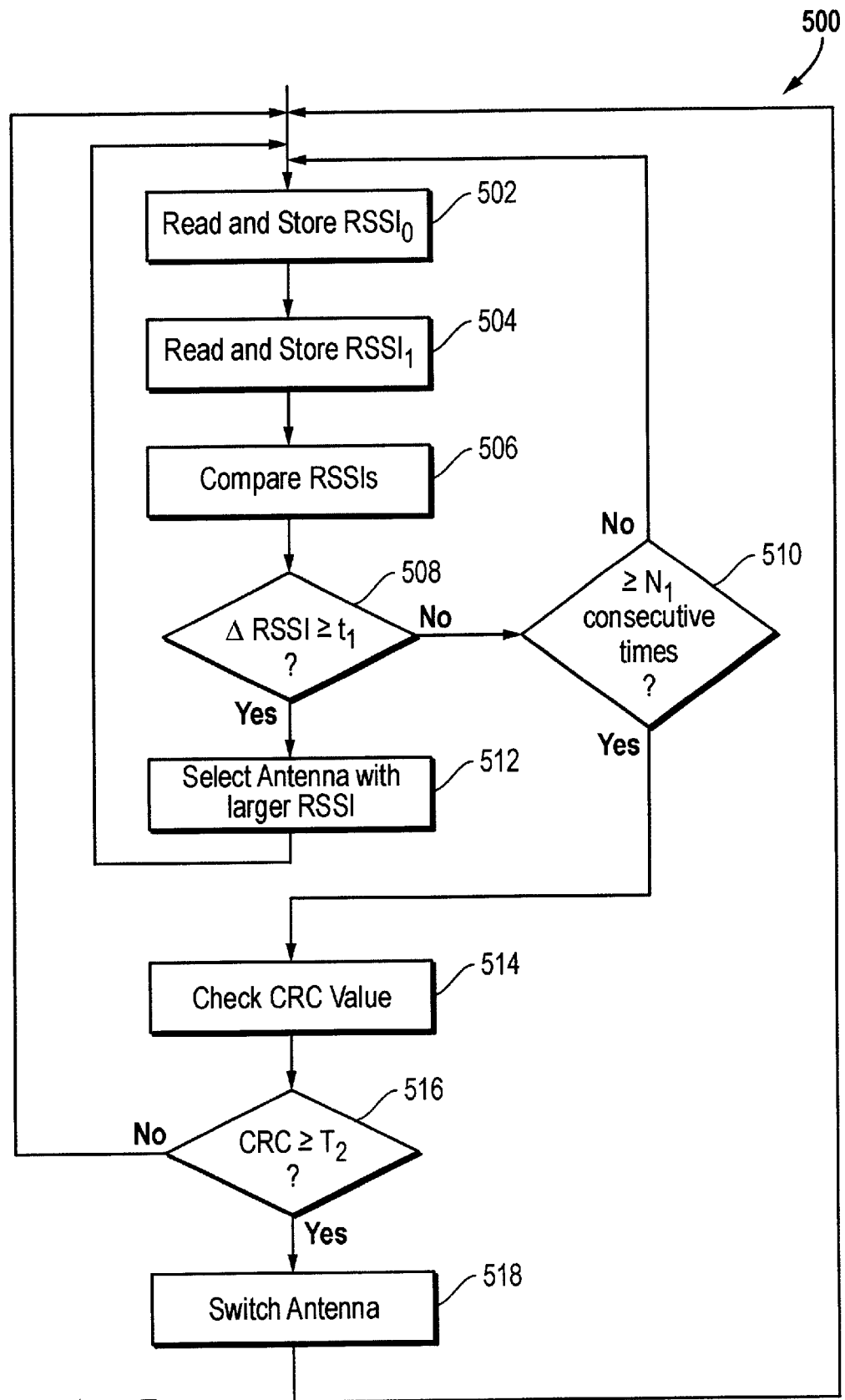
FIG. 5 is a flow chart of; a first embodiment of the antenna switching process.
Figure 7:
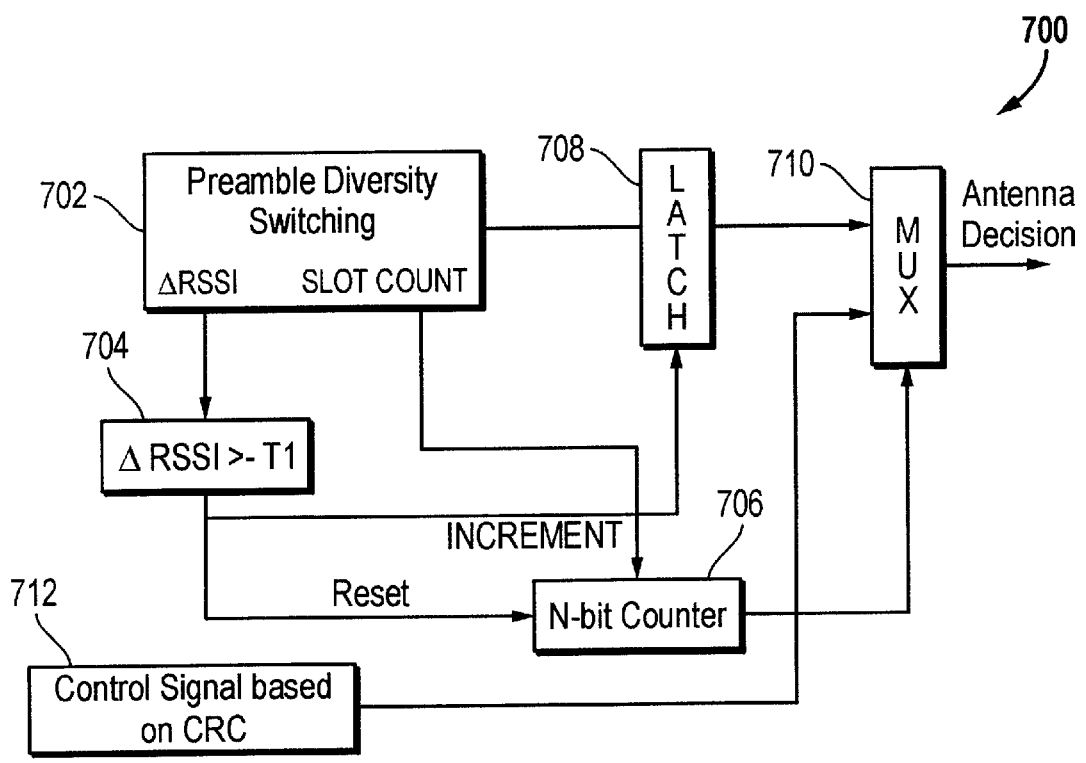
FIG. 7 is a schematic diagram of the of the antenna switching system used in the antenna switching process of FIG. 5.

In accordance with a first embodiment, an antenna selection system is illustrated in FIGS. 5 and 7. Here, a preamble diversity switching (PDS) process, a primary means, and a cyclical redundancy check (CRC), a secondary means, are used to select an antenna in systems having a plurality of antennas.

According to the first embodiment, radio frequency broadcasts are sequentially processed into receive signal strength indicators $RSSI_0$ and $RSSI_1$ and are stored, where $RSSI_0$ is measured from a first antenna (Antenna$_0$) and $RSSI_1$ is measured from a second antenna (Antenna$_1$) as illustrated in FIG. 5 (steps 502 and 504). $RSSI_0$ and $RSSI_1$ are then compared to generate a RSSI difference signal ($\Delta RSSI$). (step 506) When $\Delta RSSI$ is greater than or equal to a first predetermined quality threshold value $T_1$, the antenna having the highest RSSI value is selected and an N-bit counter is reset. (steps 508 and 512) However, when $\Delta RSSI$ is less than $T_1$, the N-bit counter is incremented and then compared to a predetermined slot count $N_1$. (steps 508 and 510) If the value of the N-bit counter is less than $N_1$, protocol requires that the preamble diversity switching process begin a new cycle. (step 510) If, however, the value of the N-bit counter is equal to or greater than $N_1$, protocol initiates CRC control. (step 510)

As previously described, the CRC like parameter authenticates data after the data is received as in a batch mode. In this process, the transmitted signal is encoded with a circular redundant code derived from the signal's content. The signal is received and decoded into a CRC error rate. (step 514) The CRC error rate is then compared to a second predetermined quality threshold value, $T_2$. (step 516) When the CRC error rate exceeds $T_2$, another antenna is selected and control is returned to the preamble switching process. (steps 516 and 518) When the CRC error rate is equal to or is less than $T_2$, no switching occurs and again control is returned to the preamble switching process. (step 516) In this embodiment a predetermined CRC error rate is used as the threshold $T_2$ to ensure high quality data and audio communications. A CRC error rate of 1%, for example, may be used as the threshold $T_2$ for audio communications, because a CRC error rate below 1% generally produces good voice quality.

The hardware implementation of the first embodiment will now be described. As depicted in FIG. 7, when the broadcast signals are received the signals are processed using a PDS circuit 702. The PDS circuit 702 produces the $\Delta RSSI$ signal which is fed to a comparator circuit 704 by a first output. When the $\Delta RSSI$ is greater than or equal to the first predetermined quality threshold value $T_1$, the comparator 704 resets an N-bit counter circuit 706 and enables a latch circuit 708. The latch circuit 708 latches a second output from the PDS circuit 702 to a multiplexer circuit 710 enabled by the N-bit counter circuit 706 to make the antenna selection. Once the $\Delta RSSI$ falls below $T_1$, the counter circuit 706 is incremented in response to a third output from the PDS control circuit 702. In this embodiment, after more than $N_1$ consecutive low $\Delta RSSI$ cycles, control of the antenna selection is transferred to a CRC circuit 712 by the N-bit counter circuit's 706 control of the multiplexer circuit 710. The CRC circuit 712 then controls antenna selection until the $\Delta RSSI$ equals or exceeds $T_1$. When $\Delta RSSI$ equals or exceeds $T_1$, the PDS circuit 702 resumes control of the selection process and the comparator circuit 704 resets the counter circuit 710.

Figure 6:
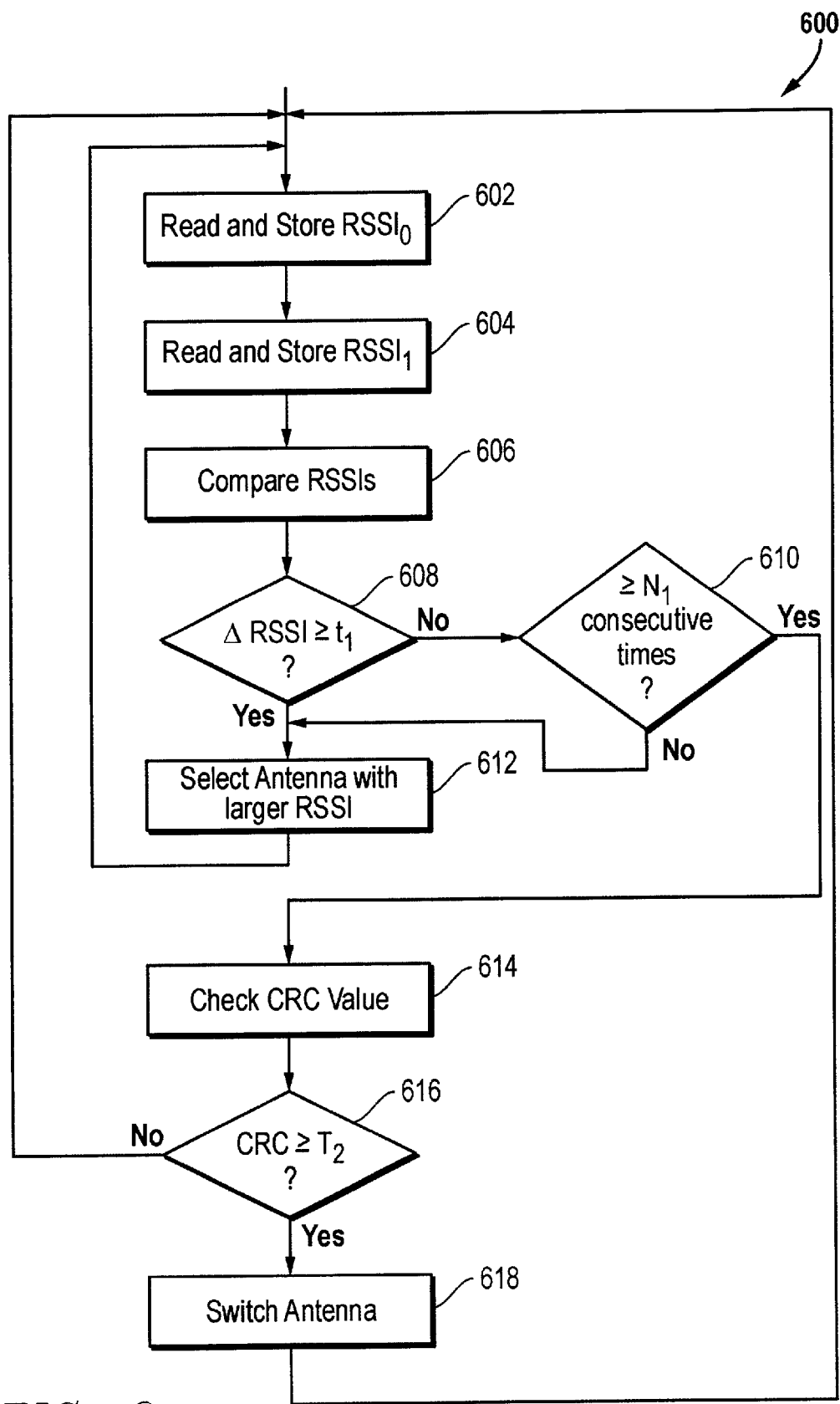
FIG. 6 is a flow chart of an alternative embodiment of the antenna switching process.

According to a second embodiment, the real-time signal authentication process or real mode controls the selection of the antenna even when $\Delta RSSI$ is less than $T_1$, Referring now to FIG. 6, the process is identical to FIG. 5 with one exception. (step 610) When the difference signal, $\Delta RSSI$, is less than the threshold $T_1$ a new cycle is not initiated. (step 610) When the N-bit counter is less than $N_1$, the antenna having the highest RSSI value is selected. (steps 610 and 612)

Figure 8:
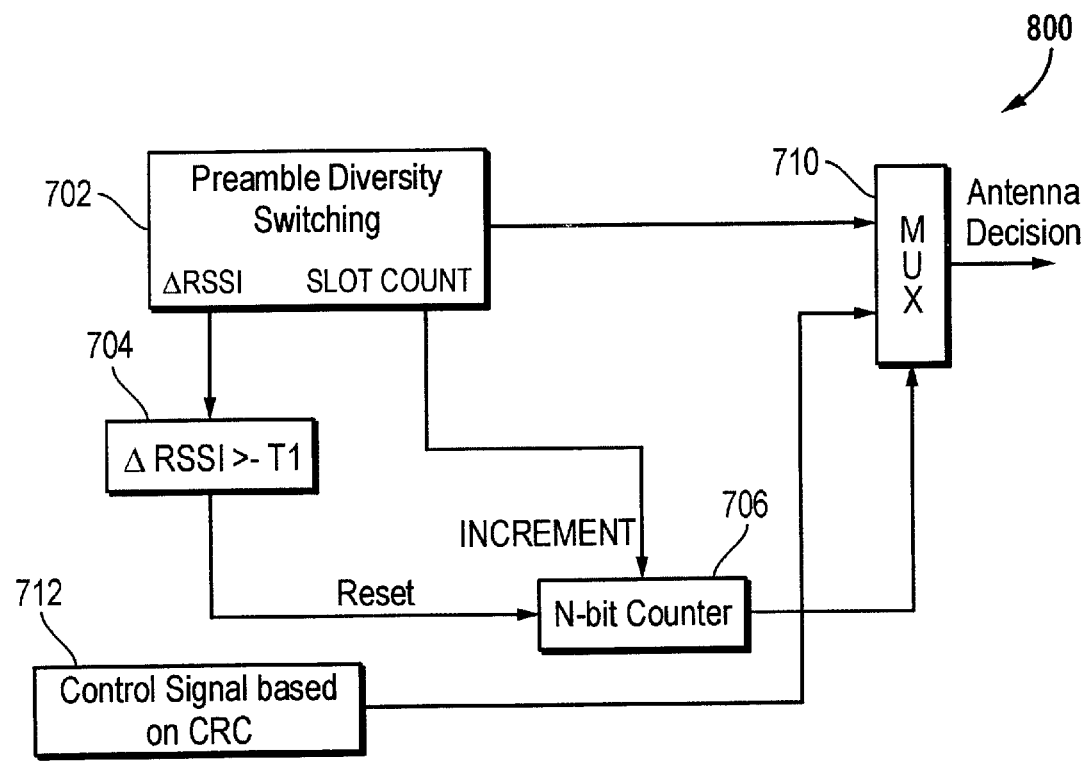
FIG. 8 is a schematic diagram of the antenna switching system used in the antenna switching process of FIG. 6.

The hardware implementation of the second embodiment is similar to the first embodiment and therefore, identical circuits are labeled with the same reference numbers. As can be readily observed from FIGS. 7 and 8, the absence of the latch circuit 708 enables the selection of the antenna having the highest RSSI value even when $\Delta RSSI$, is less than $T_1$. The N-bit counter circuit 706 does not enable the multiplexer circuit 710 to select CRC circuit 712 control until the N-bit counter 706 exceeds $N_1$.

According to a third embodiment, memory is added to the N-bit counter circuit 706. Memory facilitates base station applications by allowing this embodiment to track the location of multiple portables and identify the combination of authentication processes most frequently utilized.

The embodiments previously described use counters, threshold comparators, digital multiplexers, PDS and CRC circuits. The various parameters including $T_1$, $T_2$, and $N_1$ vary according to the environment of the embodiment's use as rural and urban areas have different receiving characteristics. It should also be noted that other real-time and time delayed or batch time authentication selection processes may be employed.

Many changes and modifications can be made to the form of the invention without departing from its spirit. The foregoing detailed description is intended to be illustrative rather than limiting and it is understood that the following claims are intended to define the scope of the invention.

We claim:
1. A method for selecting an operating antenna from a plurality (n) of antennas, comprising the steps of:
   1. selecting an operating antenna as a function of received signal strength by performing the steps of:
      (a) detecting the received signal strength at each of said antennas and storing a Received Signal Strength Indicator ($RSSI_i$) for each of said antennas, wherein $RSSI_0$ corresponds to a currently selected antenna;
      (b) calculating a delta RSSI ($\Delta RSSI_i$) equal to $RSSI_i$ minus $RSSI_0$ for each non-selected antenna;
      (c) if a maximum $\Delta RSSI_i$ value equals or exceeds a first predetermined quality threshold value, $T_1$, selecting the non-selected antenna corresponding to said maximum $\Delta RSSI_i$ to be said currently selected antenna, resetting a cycle counter, and returning to Step 1(a);

(d) if said maximum $\Delta RSSI_i$ value does not equal or exceed said first predetermined quality threshold value, $T_1$, incrementing said cycle counter, and, if said cycle counter is less than a predetermined cycle count, returning to Step 1(a), otherwise, if said cycle counter equals or exceeds said predetermined cycle count, proceeding to Step 2;

2. selecting said operating antenna as a function of a Cyclical Redundancy Check (CRC) by performing the steps of:

(a) decoding the CRC error rate of the signal received by said currently selected antenna;

(b) if the decoded CRC error rate exceeds a second predetermined quality threshold value, $T_2$, selecting the non-selected antenna corresponding to said maximum $\Delta RSSI_i$ to be said currently selected antenna, resetting said cycle counter and returning to Step 1(a);

(c) if the decoded CRC error rate does not exceed said second predetermined quality threshold value, $T_2$, resetting said cycle counter and returning to Step 1(a).

2. The method of claim 1, wherein said step 1(b) further comprises storing said $\Delta RSSI_i$.

3. The method of claim 1, wherein said cycle counter is an N-bit counter.

4. The method of claim 1, wherein said plurality of antennas are coupled to a base station.

5. The method of claim 1, wherein said plurality of antennas are coupled to a portable station.

6. A method for selecting an operating antenna from a plurality (n) of antennas, comprising the steps of:

1. selecting an operating antenna as a function of received signal strength by performing the steps of:

(a) detecting the received signal strength at each of said antennas and storing a Received Signal Strength Indicator ($RSSI_i$) for each of said antennas, wherein $RSSI_0$ corresponds to a currently selected antenna;

(b) calculating a delta RSSI ($\Delta RSSI_1$) equal to $RSSI_i$ minus $RSSI_0$ for each non-selected antenna;

(c) if a maximum $\Delta RSSI_i$ value equals or exceeds a first predetermined quality threshold value, $T_1$, selecting the non-selected antenna corresponding to said maximum $\Delta RSSI_i$ to be said currently selected antenna, resetting a cycle counter, and returning to Step 1(a);

(d) if said maximum $\Delta RSSI_i$ value does not equal or exceed said first predetermined quality threshold value, $T_1$, incrementing said cycle counter, and, if said cycle counter is less than a predetermined cycle count, selecting the non-selected antenna corresponding to said maximum $\Delta RSSI$ and returning to Step 1(a), otherwise, if said cycle counter equals or exceeds said predetermined cycle count, proceeding to Step 2;

2. selecting said operating antenna as a function of said Cyclical Redundancy Check (CRC) by performing the steps of:

(a) decoding the CRC error rate of the signal received by said currently selected antenna;

(b) if the decoded CRC error rate exceeds a second predetermined quality threshold value, $T_2$, selecting the non-selected antenna corresponding to said maximum $\Delta RSSI_i$ to be said currently selected antenna, resetting said cycle counter and returning to Step 1(a);

(c) decoded CRC error rate does not exceed said second predetermined quality threshold value, $T_2$, resetting said cycle counter and returning to Step 1(a).

7. The method of claims 6, wherein said step 1(b) further comprises storing said $\Delta RSSI_i$.

8. The method of claim 6, wherein said cycle counter is an N-bit counter.

9. The method of claim 6, wherein said plurality of antennas are coupled to a base station.

10. The method of claim 6, wherein said plurality of antennas are coupled to a portable station.

11. A system for selecting an operating antenna from a plurality (n) of antennas, comprising:

1. circuitry operable to select an operating antenna as a function of received signal strength, comprising circuitry operable to:

(a) detect the received signal strength at each of said antennas and store a Received Signal Strength Indicator ($RSSI_i$) for each of said antennas, wherein $RSSI_0$ corresponds to a currently selected, antenna;

(b) calculate a delta RSSI ($\Delta RSSI_i$) equal to $RSSI_i$ minus $RSSI_0$ for each non-selected antenna;

(c) if a maximum $\Delta RSSI_i$ value equals or exceeds a first predetermined quality threshold value, $T_1$, select the non-selected antenna corresponding to said maximum $\Delta RSSI_i$ to be said currently selected antenna, reset a cycle counter, and return to element 1(a);

(d) if said maximum $\Delta RSSI_1$ value does not equal or exceed said first predetermined quality threshold value, $T_1$, increment said cycle counter and if said cycle counter is less than a predetermined cycle count, return to element 1(a), otherwise, if said cycle counter equals or exceeds said predetermined cycle count, select said operating antenna as a function of a Cyclical Redundancy Check (CRC) using the circuitry defined in element 2;

2. circuitry operable to select said operating antenna as a function of said Cyclical Redundancy Check (CRC), comprising circuitry operable to:

(a) decode the CRC error rate of the signal received by said currently selected antenna;

(b) if the decoded CRC error rate exceeds a second predetermined quality threshold value, $T_2$, select the non-selected antenna corresponding to said maximum $\Delta RSSI_i$ to be said currently selected antenna resuming operation as defined in element 1(a);

(c) if the decoded CRC error rate does not exceed said second predetermined quality threshold value, $T_2$, reset said cycle counter resuming operation as defined in element 1(a).

12. The system in claim 11, wherein said cycle counter is an N-bit counter.

13. The system in claim 11, wherein said system is associated with a portable station.

14. The system in claim 11, wherein said system is associated with a base station.

15. A system for selecting an operating antenna from a plurality (n) of antennas, comprising:

1circuitry operable to select an operating antenna as a function of received signal strength, comprising circuitry operable to:

(a) detect the received signal strength at each of said antennas and store a Received Signal Strength Indicator ($RSSI_i$) for each of said antennas, wherein $RSSI_0$ corresponds to a currently selected antenna;

(b) calculate a delta RSSI ($\Delta RSSI_i$) equal to $RSSI_i$ minus $RSSI_0$ for each non-selected antenna;

(c) if a maximum $\Delta RSSI_i$ value equals or exceeds a first predetermined quality threshold value, $T_1$, select the non-selected antenna corresponding to said maximum $\Delta RSSI_i$ to be said currently selected antenna, reset a cycle counter, and resume operation as defined in element 1(*a*);

(d) if said maximum value does not equal or exceed said first predetermined quality threshold value, $T_1$, increment said cycle counter and if said cycle counter is less than a predetermined cycle count, selecting the non-selected antenna corresponding to said. maximum $\Delta RSSI_i$ and return to element 1(*a*), otherwise, if said cycle counter equals or exceeds said predetermined cycle count, select said operating antenna as a function of a Cyclical Redundancy Check (CRC) using the circuitry defined in element 2;

2. circuitry operable to select said. operating antenna as a function of said Cyclical Redundancy Check (CRC), comprising circuitry operable to:

(a) decode the CRC error rate of the signal received by said currently selected antenna;

(b) if the decoded CRC error rate exceeds a second predetermined quality threshold value, $T_2$, select the non-selected antenna corresponding to said maximum $\Delta RSSI_i$ to be said currently selected antenna and resume operation as defined in element 1(*a*);

(c) if the decoded CRC error rate does not exceed said second predetermined quality threshold value, $T_2$, reset said cycle counter and return to element 1(*a*).

16. The system in claim 15, wherein said cycle counter is an N-bit counter.

17. The system in claim 15, wherein said system is associated with a portable station.

18. The system in claim 15, wherein said system is associated with a base station.

* * * * *